May 20, 1930.   D. T. BROWNLEE   1,759,684
ANTIREVERSE SAFETY CLUTCH
Filed April 4, 1928
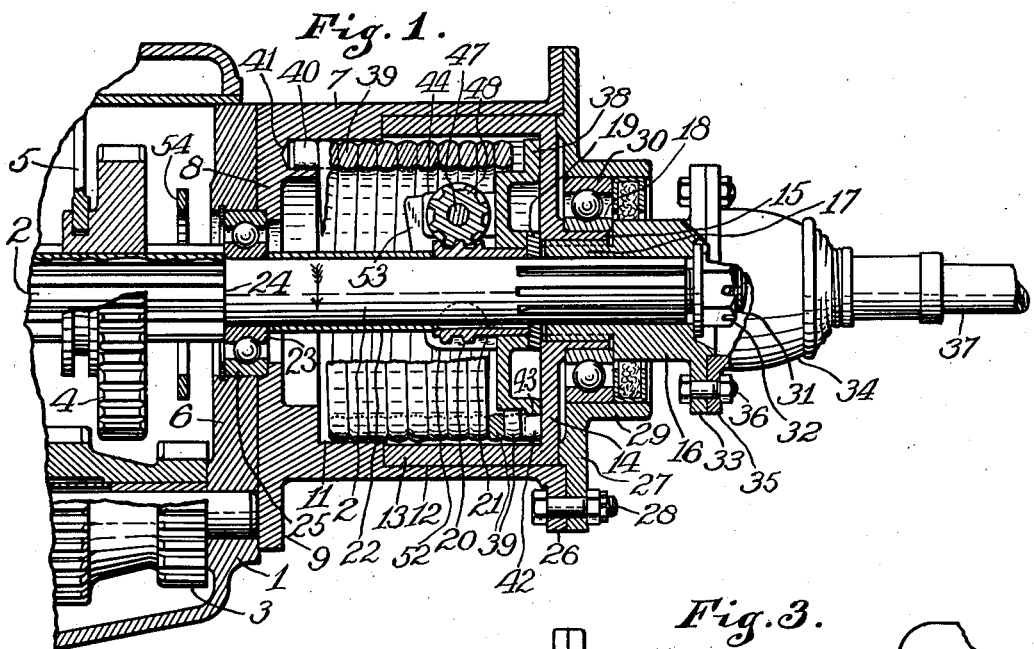
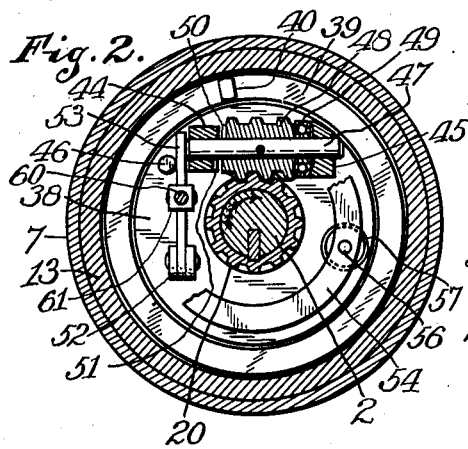
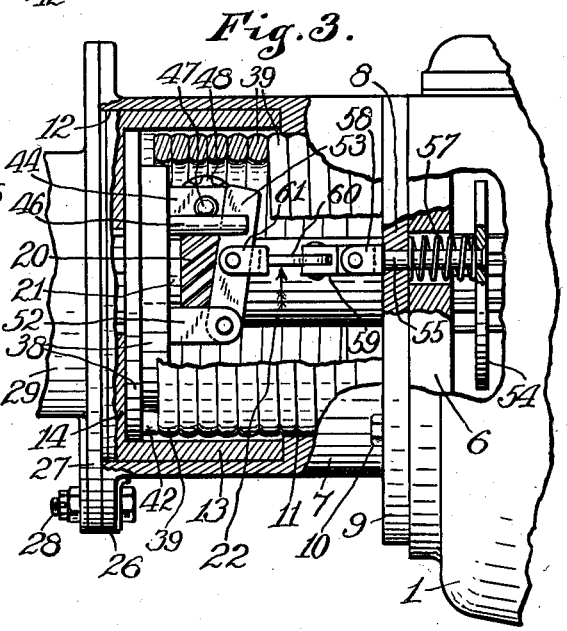
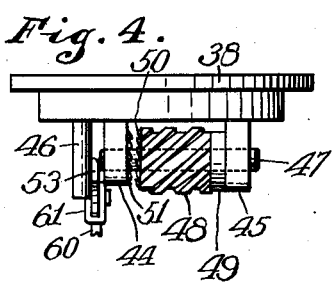
INVENTOR:
Dalmar T. Brownlee,
BY
E. T. Silvius,
ATTORNEY.

Patented May 20, 1930

1,759,684

UNITED STATES PATENT OFFICE

DALMAR TEMPLETON BROWNLEE, OF INDIANAPOLIS, INDIANA, ASSIGNOR TO L. G. S. DEVICES CORPORATION, OF INDIANAPOLIS, INDIANA, A CORPORATION OF INDIANA

ANTIREVERSE SAFETY CLUTCH

Application filed April 4, 1928. Serial No. 267,236.

This invention relates generally to apparatus for preventing unintentional reverse movement of a rotary shaft, the invention having reference more particularly to means for preventing the reverse movement but permitting intentional reverse movement.

An object of the invention is to provide an improved anti-reverse safety apparatus of the above-mentioned character that shall be of simple and not costly construction and adapted to operate reliably when emergency requires its operation.

Another object is to provide an efficient but smoothly operating and noiseless anti-reverse safety apparatus which shall be of such construction as to be adapted for application to motor-vehicles having speed-changing and reversing transmission gearing to guard against accidents that may result when a motor-vehicle runs backward after it has stopped while ascending a hill, such as reverse movements occurring at times when brakes fail to hold or are not applied in the emergency.

A further object is to provide an improved anti-reverse apparatus for motor-vehicles which shall be of such construction as to automatically operate with promptness in emergency, and permit intentional reverse movements under automatic control in connection with gear shifting apparatus.

A still further object is to provide an improved anti-reverse safety apparatus for motor-vehicles, which shall be of such construction as to advantageously embrace a spring-clutch and mounting and controlling elements therefor, of simple and reliable construction and easy assemblage, and which shall be adapted to be durable and economical in use.

With the above-mentioned and other objects in view, the invention consists in a novel application of a clutch and improved controlling means therefor including novel means for preventing action of the clutch under control, the clutch being automatically controlled to stop unintentional reverse movements of a shaft; the invention consisting further in the novel parts and in the combinations and arrangements of parts as hereinafter particularly described and further defined in the appended claims.

Referring to the accompanying drawings,—Figure 1 is a longitudinal central section of the anti-reverse apparatus in connection with a motor-vehicle motion transmission set; Fig. 2 is a transverse section of Fig. 1 taken on different planes to show the relative arrangement of various important elements; Fig. 3 is a fragmentary section in reversed order relatively to Fig. 1 and partially broken away; and Fig. 4 is a top plan of an assembly of controlling elements more clearly shown than in the other views.

Similar reference characters in the different figures of the drawings indicate corresponding elements or features of construction herein referred to in detail.

The invention, for the purpose of describing its construction and functions, is shown in connection with a well-known type of speed-changing transmission gearing, a portion of the latter being sufficient to an understanding of the invention. The transmission gearing has a casing 1 through which a transmission shaft 2 extends, a gear wheel 3 with other speed-changing gears being rotatably supported in the casing, another gear wheel 4 being splined on the shaft and adjustable thereon by means of a shifter 5, the wheel 4 being moved towards the head portion 6 of the casing to be connected through an idler gear (not shown) with the wheel 3 whereby to cause reverse motion of the shaft when it is desired to propel the motor-vehicle backwards.

The invention comprises a suitable incasing housing 7 which has a bottom or base portion 8 provided with a flange 9 that is secured to the casing head portion 6 by means of bolts 10. Both the head portion 6 and the bottom portion 8 have suitable openings in which the transmission shaft operates. The housing 7 preferably is cylindrical and has a bore 11 therein and also a counterbore 12 in which an annular clutch part 13 is rotatably arranged and having a smooth internal diameter slightly greater than the diameter of the bore 2. The clutch part 13 has a web 14 in its outer end which has a hollow neck 15 centrally on its outer side that is suitably larger diametrically than the transmission shaft on which a coupling member 16 is splined that has an annular boss 17 on its inner end which extends into the neck 15 and is keyed thereto. A bearing member 18 is tightly pressed on the neck 15 against the web 14 by the member 16. A collar 19 is arranged on the shaft 2 against the inner side of the web 14, a gear wheel 20 is keyed to the shaft and has a hub extension 21 in contact with the collar, the opposite side of the gear wheel having contact with a tube 22 arranged on the shaft as a spacer, a bearing member 23 being arranged on the shaft against the tube and in contact with a shoulder 24 on the shaft, an opposing bearing member 25 being suitably seated in the head portion 6 and partially in the bottom portion 8, the bearing members co-operating to rotatably support the shaft, preferably by means of a suitable intervening anti-friction device, such as balls or rollers. The housing 7 has a flange 26 whereby a housing head 27 is secured in place by means of bolts 28, the head having an annular journal box 29 on its outer side so as to extend about the bearing member 18, the box 29 being provided with a bearing member 30 to co-operate with the member 18, preferably by means of intervening balls or rollers, to rotatably support the shaft. The shaft has a screw-thread end portion 31 on which is a nut 32 whereby assembly and securing of parts on the shaft are facilitated. The coupling member 16 has a flange 33, and a conventional universal coupler 34 has a flange 35 secured to the flange 33 by bolts 36, to couple a conventional propeller shaft 37 to the transmission shaft.

An important element, in the preferred form of construction comprises a head plate 38 rotatively arranged on the hub extension 21 and against the collar 19, the marginal portion of the plate being adjacent to the web 14. The head plate has an off-set middle portion, about which one end portion of a coil spring clutch 39 extends that is slightly less in diameter externally than the clutch member 13 internally and has its opposite end portion secured in the bore 11, and preferably has a projecting lug 40 that extends into a pocket 41 in the bottom portion 8 of the housing. The major portion of the spring clutch is within the clutch member 13 to be diametrically expanded into clutching contact therewith and its outer end portion is provided with a lug 42 that extends into a pocket 43 in the head plate 38, so that when the head plate is slightly turned it causes a slight unwinding movement of the spring clutch which results in diametrical expansion of the clutch into contact with the clutch member 13, whereby rotation of the transmission shaft is prevented, being locked to the stationary housing.

The clutch is provided with novel controlling means, preferably comprising two bearing blocks 44 and 45 fixed to the head plate 38, preferably a guide stud 46 being fixed also to the plate at a suitable distance from the block 44. A spindle 47 is supported in the bearing block to rotate and permit slight longitudinal movement, and a pinion 48 is fixed to the spindle and in mesh with the gear wheel 20, the gear wheel and the pinion having spiral teeth, and an anti-frictional thrust bearing 49 is arranged on the spindle between the block 45 and the adjacent end of the pinion. The opposite end of the pinion has ratchet teeth 50 thereon to be carried into engagement with ratchet teeth 51 with which the block 44 is provided. A pivot jaw 52 is fixed on the head plate 38 and pivotally supports one end of a stop bar 53 to be swung between the block 44 and the stud 46 into contact with the adjacent end of the spindle for preventing action of the ratchet teeth. To operate and control the stop bar an annular control plate 54 is arranged between the gear wheel 4 and the casing head 6 to extend about the shaft 2, and is supported and guided by two rods 55 and 56 secured thereto and guided in the housing bottom portion 8, the rods extending through suitable openings in the head 6 and having each a retracting spring 57 thereon seated against the plate 54 and against the bottom portion 8 in a suitable pocket provided in the head portion 6, each rod having a head 58 thereon that is stopped against the bottom portion 3. The rod 55 has a jaw-shaped head to which a jaw 59 is pivoted, and a rod 60 is pivoted to the jaw and has a jaw 61 thereon pivotally connected to the bar 53, so that the control rod of the stop bar is laterally flexible, to permit slight rotary movements of the head plate 38 without restraint by the controlling connections.

In practical use, the transmission shaft rotates in the direction indicated by the arrows thereon to impart forward motion when propelling a motor-vehicle, the gear wheel 4 being at a distance from the head portion 6 of the transmission gear casing, permitting the plate 54 to also be held by the springs 57 away from the head portion 6, the action of the springs holding the stop bar 53 away from the end of the spindle 47. The rotation of the gear wheel 20 while rotating the pinion 48 tends to maintain the pinion in contact with the thrust bearing 49 and the ratchet teeth 50 away from the teeth 51, the spring clutch having no contact with the clutch member 13 but being connected with the head plate 38 ordinarily prevents rotation of the latter, normal operation of the transmission gearing occurring. In case of stoppage of the transmission shaft, followed by a slight backward movement of the motor-vehicle, the transmission shaft begins to turn in the reverse direction, the gear wheel 20 instantly pushing the pinion 48 while rotating the pinion over towards the bearing block 44 and forcing the teeth 50 into engagement with the teeth 51 whereby rotation of the pinion is positively stopped, resulting in slight rotary movement of the head plate 38 which actuates the spring clutch so that it is expanded into contact with the clutch member 13 and thus causing the automatic locking of the transmission shaft against rotation which through the propeller shaft prevents rotation of the motor-vehicle driving wheels which may have started to roll down a hill. When it is desired to propel the motor-vehicle backwards, the gear wheel 4 is shifted back to the plate 54 and moves the latter whereby through the controlling connections the stop bar 53 is moved into engagement with the end of the spindle 47 and prevents operation of the ratchet teeth while the transmission shaft is motor-driven in the reverse direction, the pinion 48 freely rotating. When the pinion is disengaged from the bearing block 44 the spring clutch is permitted to contract and release itself from the clutch member 13.

What is claimed is:

1. Anti-reverse safety apparatus having an operable friction clutch device, a rotary transmission shaft provided with a clutch member to be engaged by the clutch device for arresting reverse movement of the shaft, and control means mounted on the shaft to control the clutch device for permitting reverse movement and alternatively also forward movement of the shaft.

2. Anti-reverse safety apparatus having noiseless friction clutch means, a rotary transmission shaft rotatably free of the clutch means in one direction, and clutch-controlling means in co-operation with the shaft to actuate the clutch means to arrest reverse motion of the shaft, the clutch-controlling means having an instrumentality operable to permit free rotation of the shaft in the one or the reverse direction.

3. Anti-reverse safety apparatus including a rotary transmission shaft normally to rotate in forward direction, a housing for the shaft provided with a head plate rotatively supported by the shaft, a coil spring clutch connected to the housing and to the head plate, an annular clutch member extending about the clutch to be engaged thereby and having connection with the shaft to rotate therewith, and clutch-controlling means mounted on the head plate to co-operate therewith and having actuating connection with the shaft to automatically stop rotation of the shaft upon the starting of reverse movement of the shaft, the clutch-controlling means being operative to permit the reverse movement of the shaft.

4. Anti-reverse safety apparatus comprising a housing, a transmission shaft rotatably supported in the housing, an annular clutch member in the housing having a fixed connection with the shaft, a coil spring clutch device secured at one end to the housing and diametrically expansible to engage the clutch member, a head plate rotatively supported by the shaft inside the clutch member and having operative connection with the opposite end of the clutch device, the head plate having opposite bearing blocks fixed thereon, the head one of said blocks having teeth on its inner side, a spiral-tooth pinion having a spindle rotatably and longitudinally supported in said blocks, said spindle extending through said head blocks, one side of the pinion having teeth thereon to be carried into engagement with the teeth on said block, a spiral-tooth wheel secured to the shaft in mesh with the pinion, a stop bar pivotally supported on the head plate and movable into contact with the end of said spindle adjacent to said head bearing block, a flexible controlling rod connected to the stop bar and guided by said housing, and a retracting spring on said rod normally holding the stop bar away from said spindle, with a gear wheel slidable on said shaft to engage and operate said controlling rod in opposition to the retracting spring.

5. In an anti-reverse safety clutch, the combination of a rotary transmission shaft driven at one end thereof, a housing for the shaft, a diametrically changeable coil spring clutch device secured at one end to the housing, an annular clutch member having a fixed connection with the shaft to be engaged by the clutch device for stopping reverse rotation of the shaft, and controlling means supported by the shaft to automatically actuate the clutch device upon reverse movement of the shaft by power applied to the opposite end of the shaft.

6. In an anti-reverse safety clutch, the combination of a housing, a shaft rotatably supported in the housing, a clutch member fixedly connected to the shaft, a head plate rotatively supported by the shaft and having a pinion rotatable thereon, a gear wheel secured to the shaft in mesh with the pinion, a coil spring clutch device connected to the housing and the head plate to operate in connection with the clutch member for arresting reverse movement of the shaft, and means on the head plate controlling rotary movement thereof and controlled by the pinion to control operation of the clutch device.

7. In an anti-reverse safety clutch, the combination of a rotary transmission shaft normally to rotate in one direction, an operable clutch to stop movement of the shaft when started to rotate in the reverse direction, controlling means constantly operated by the shaft to automatically operate the clutch upon reverse movement of the shaft, and a manually-actuated device to intervene in the controlling means to prevent the operation of the clutch.

8. In an anti-reverse safety clutch, the combination of a rotary transmission shaft normally to rotate in one direction, a gear wheel secured to the shaft, an operable friction clutch to stop movement of the shaft when started to rotate in the reverse direction, controlling means constantly operated by the gear wheel to automatically operate the clutch upon reverse movement of the shaft, and a manually-actuated device to intervene in the controlling means and in co-operation with the gear wheel to prevent operation of the clutch for permitting the reverse motion of the shaft.

9. In an anti-reverse safety clutch, the combination with a rotary shaft, and a clutch operable to stop rotation of the shaft, of a head plate rotatively supported by the shaft to actuate the clutch, a spiral-tooth wheel secured to the shaft, a spiral-tooth pinion mounted on the head plate in engagement with the wheel to be rotated and shifted laterally by the wheel, locking means to stop rotation of the pinion when shifted in one direction to enable the wheel to actuate the head plate for actuating the clutch, and a stop device operable to prevent action of the locking means for permitting rotation of the shaft in the reverse direction.

10. In an anti-reverse safety clutch, the combination of a housing, a rotary shaft in and extending through the housing, the shaft having a shoulder in proximity to the bottom end of the housing, a bearing member on the shaft against said shoulder, a tube on the shaft against said member, a gear wheel keyed to the shaft against the tube and having a hub extension, a collar on the shaft against said hub extension, a clutch member web in contact at one side with the collar and having a neck on its opposite side, an outer end bearing member on said neck against the web, a coupling member in contact with the outer end bearing member and splined to the shaft, the coupling member having a boss extending into said neck and keyed thereto, a nut secured to the end portion of the shaft, and bearing on said coupling member, and means supported in the housing and rotatably supporting said bearing members.

In testimony whereof, I affix my signature on the 30th day of March, 1928.

DALMAR TEMPLETON BROWNLEE.